United States Patent [19]

Heap et al.

[11] Patent Number: 4,861,567

[45] Date of Patent: Aug. 29, 1989

[54] METHODS OF REDUCING $NO_x$ AND $SO_x$ EMISSIONS FROM COMBUSTION SYSTEMS

[75] Inventors: Michael P. Heap, Corona Del Mar; Shih L. Chen, Irvine; James M. McCarthy, Laguna Beach, all of Calif.; David W. Pershing, Salt Lake City, Utah

[73] Assignee: Energy and Environmental Research Corporation, Irvine, Calif.

[21] Appl. No.: 39,324

[22] Filed: Apr. 16, 1987

[51] Int. Cl.$^4$ .................... C01B 21/00; C01B 17/00; B01J 8/00

[52] U.S. Cl. .................... 423/235; 423/239; 423/244

[58] Field of Search .................. 423/235, 235 D, 239, 423/239 A, 244 A, 244

[56] References Cited

U.S. PATENT DOCUMENTS

| | | | |
|---|---|---|---|
| 3,382,822 | 5/1968 | Bienstock et al. | 110/28 |
| 3,900,554 | 8/1975 | Lyon | 423/235 |
| 4,041,699 | 8/1977 | Schelp | 60/39.55 |
| 4,208,386 | 6/1980 | Arand et al. | 423/235 |
| 4,325,924 | 4/1982 | Arand et al. | 423/235 |
| 4,335,084 | 6/1982 | Brogan | 423/235 |
| 4,350,669 | 9/1982 | Izumi et al. | 423/235 |
| 4,368,057 | 1/1983 | Matthews | 48/197 |
| 4,395,223 | 7/1983 | Okigami et al. | 431/10 |
| 4,731,231 | 3/1988 | Perry | 423/235 |
| 4,731,233 | 3/1988 | Thompson et al. | 423/244 |

FOREIGN PATENT DOCUMENTS

| | | |
|---|---|---|
| 2719417 | 2/1978 | Fed. Rep. of Germany . |
| 54-28771 | 3/1979 | Japan .................... 423/235 |
| 1572118 | 7/1980 | United Kingdom . |

OTHER PUBLICATIONS

English translation of Japanese Patent Application No. 090185, filed Jul. 25, 1975, published Feb. 3, 1977 and previously cited as Abstract No. 19017Y/11.
English translation of Japanese Patent Application No. 112559, filed Sep. 19, 1975, published Apr. 2, 1977 and previously cited as Abstract No. 35069Y/20.
English translation of Japanese Patent Application No.

(List continued on next page.)

Primary Examiner—Gregory A. Heller
Attorney, Agent, or Firm—Workman, Nydegger & Jensen

[57] ABSTRACT

The present invention relates to methods for selectively reducing $NO_x$ so that nitrogen can be removed from emission effluent streams and $NO_x$ emissions can be reduced to very low levels. In addition, the present invention teaches a method whereby $NO_x$ and $SO_x$ may be simultaneously removed from the effluent stream.

The present invention teaches the reduction of $NO_x$ with cyanuric acid. Initially, cyanuric acid is decomposed to form decomposition products. The reaction of cyanuric acid to produce its decomposition products, such as isocyanic acid or related reaction intermediates, takes place in an oxygen-free, fuel rich, decomposition zone with the reaction temperature in the range of from about 1000° F. to about 3000° F.

After the cyanuric acid is decomposed in the absence of oxygen, the decomposition stream is mixed with the effluent stream containing $NO_x$. At this point the oxygen level of the stream must be carefully controlled to provide an excess of oxygen. It may be necessary at this point to inject air into the effluent stream in order to maintain the proper oxygen-rich (fuel-lean) conditions for $NO_x$ reduction.

In the second "reaction zone," reduction takes place at temperatures of from approximately 1200° F. to approximately 2600° F.

The present invention can also be combined with $SO_x$ control technology. Specifically, species used to control $SO_x$, such as limestone, dolomite, quicklime, and hydrated lime, can be added to the cyanuric acid for injection into the effluent stream. Thus, simultaneous $NO_x$ and $SO_x$ control can be achieved.

44 Claims, 3 Drawing Sheets

OTHER PUBLICATIONS 152847, filed Dec. 21, 1976, published Jul. 7, 1976 and previously cited as Abstract No. 57829A/32.

English translation of Japanese Patent Application No. 104767, filed Sep. 2, 1977, published Mar. 22, 1979 and previously cited as Abstract No. 34164B/18.

R. A. Perry et al., "Rapid Reduction of Nitrogen Oxides in Exhaust Gas Streams", Nature, vol. 324, 18/25, pp. 657–658.

T. Yano et al., "Behavior of Methanol and Formaldehyde in Burned Gas From Methanol Combustion, Effects of Nitric Oxide on Oxidation Reaction", Bulletin of the SME, vol. 26, No. 213, pp. 406–413 (Mar. 1983).

Abstract No. 34164B/18, Toray Industries, Inc., Mar. 22, 1979.

Abstract No. 19017Y/11, Nippon Steel Chem KK, Mar. 2, 1977.

Abstract No. 35069Y/20, Toray Industries KK, Apr. 2, 1977.

Abstract No. 57829A/32, Mitsubishi Heavy Ind. KK, Jul. 7, 1978.

METHODS OF REDUCING $NO_x$ AND $SO_x$ EMISSIONS FROM COMBUSTION SYSTEMS

BACKGROUND

The Field of the Invention

The present invention is related to methods for reducing $NO_x$ emissions from pollution sources, such as combustion systems. More particularly, the present invention relates to the noncatalytic, selective reduction of $NO_x$ by cyanuric acid to achieve very low levels of $NO_x$ emissions.

The Background of the Invention

One of the major problems in industrialized society is the production of air pollution from numerous sources. Air pollution can take various forms. Some of the different types of air pollutants include particulate emissions such as coal ash, partially burned coal particles, and the like, sulfur compounds such as $SO_2$ and $SO_3$ (sometimes collectively referred to as "$SO_x$"), ozone, carbon oxide emissions, volatile hydrocarbon emissions, and emissions of nitrogen oxides (commonly referred to collectively as "$NO_x$"). Pollution sources include automobiles, industrial plants, small commercial establishments, such as dry cleaners and service stations, and even nature itself.

Combustion effluents and waste products from particular types of sources have proven to be major contributors to damaging air pollution when the effluents are discharged into the atmosphere. Unless these waste products are treated before their release into the atmosphere, serious smog and air pollution problems are encountered.

It will be appreciated that high concentrations of air pollutants have serious deleterious impacts on the health and general welfare of society. Air pollution is known to aggravate certain medical conditions (such as heart and lung problems) and is known to cause problems in the environment, ranging from corrosion to acid rain.

One of the most common components found in polluted air is nitrogen dioxide ("$NO_2$") which is known to be toxic. Nitrogen dioxide, which is brown in color, undergoes a series of reactions, known generally as "photochemical smog formation," in the presence of sunlight and airborne hydrocarbons. These reactions result in a marked decline in overall air quality.

While $NO_2$ is produced from a wide variety of pollution sources, its primary source is from nitric oxide ("NO") released into the air. NO is commonly formed during combustion processes, including internal combustion engines in automobiles, hydrocarbon fuel power plants, process furnaces, incinerators, coal fired utility boilers, glass furnaces, cement kilns, oil field steam generators, gas turbines, and other similar installations.

There are two primary mechanisms for the formation of nitrogen oxides in the combustion processes. Within the high temperature portions of a flame, atmospheric oxygen can react with molecular nitrogen ("$N_2$") to form NO by the high temperature "thermal fixation" mechanism.

In addition, fuels which contain large amounts of nitrogen chemically bound within the fuel structure may produce significant $NO_x$ emissions as a result of the oxidation of the fuel nitrogen during the burning process. This source of $NO_x$ emission (often termed "fuel $NO_x$") is the predominant source of $NO_x$ with the combustion of coal, heavy oils, biological and agricultural residues, and some municipal, industrial, and agricultural wastes.

Since NO is the primary oxide of nitrogen which is stable at the high temperatures encountered in these types of combustion processes, NO is the predominant nitrogen emission product. At normal atmospheric temperatures, however, the equilibrium between NO and $NO_2$ favors $NO_2$. Hence, NO formed by combustion is generally discharged into the atmosphere as NO, and only subsequently converted to $NO_2$. In order to control $NO_2$ emissions, therefore, it is necessary to eliminate NO before it enters the atmosphere.

There have been considerable efforts in the art to find effective ways to remove oxides of nitrogen from waste gases so that these waste gases may be discharged to the atmosphere without harm to the environment.

Because the "thermal fixation" of atmospheric nitrogen is exclusively a high temperature phenomenon, occurring above 2800° F., it has been possible to achieve significant reductions in $NO_x$ emissions from the combustion of nitrogen-free fuels (such as natural gas or gasoline) by reducing the overall temperature in the combustion zone. This is accomplished using techniques such as exhaust gas recirculation in automobiles or flue gas recirculation in utility boilers.

Fuel $NO_x$ formation is most easily controlled by limiting the amount of oxygen present during the period in which the nitrogen species are being evolved from the fuel matrix. Techniques such as a staged combustion, overfire air addition, and "burners out of service" will use this concept to limit fuel and nitrogen oxidation.

More recently, it has been recognized that limited amounts of hydrocarbon fuels, particularly those which do not contain fuel nitrogen, can be used to effectively incinerate NO formed in the main combustion zone by creating a fuel rich (oxygen deficient) environment downstream of the primary combustion zone. This technique is generically termed "reburning," and like the other combustion modification techniques, is capable of producing overall $NO_x$ reductions in excess of 50% under optimized conditions.

Unfortunately, at the present time, none of the combustion modification techniques are capable of producing very high levels of $NO_x$ control in the range of approximately 80% to 90%. To achieve extremely low $NO_x$ emission levels, it is necessary to utilize some type of downstream, effluent gas cleanup system.

It has been found in the art that removal of $NO_2$ from a combustion effluent stream is relatively easy since it reacts with water and air to form nitric acid. $NO_2$, therefore, is commonly removed by aqueous scrubbing. If a base, such as ammonia, is added to the scrub water, the nitrogen scrubbing process is facilitated and ammonium nitrate is produced. If limited amounts of NO are present along with the $NO_2$, the NO may be coscrubbed, thereby yielding ammonium nitrate.

Most chemical scrubbing techniques are subject to the limitation that they are only effective for mixtures of nitrogen oxides which are predominantly $NO_2$, rather than predominantly NO. This presents a problem because NO is the predominant species at the high temperatures generally encountered in flue gases. As a result, various processes have been developed in the art for oxidizing NO to $NO_2$ so that the relatively inexpensive and convenient scrubbing processes may take place.

Several processes known in the prior art involve contacting the gaseous flow which includes NO, with various organic compounds (such as aldehydes, alcohols, ketones, organic acids, and the like) in the presence of oxygen. By such processes, the NO is oxidized to $NO_2$ which can then be removed by scrubbing as described above. None of these processes, however, are capable of efficiently producing very low levels of $NO_x$ emissions.

An alternative approach for removing NO from flue gases and other streams of pollutants is to reduce NO to nitrogen and water, which may then be discharged to the atmosphere. Reduction of $NO_x$ may be accomplished with or without catalytic assistance. Practically, the noncatalytic processes are preferable because they are not subject to the usual disadvantages of employing catalysts. Some of these additional disadvantages include higher expense associated with the catalyst, the potential of catalyst plugging, the expense and difficulty of contacting the combustion effluents with the catalyst, and the danger that the catalyst will disintegrate and be emitted into the atmosphere.

Alternatively, $NO_x$ reduction processes often teach the removal of $NO_x$ from flue gases by reduction of the NO by the addition of ammonia, urea, or ammonia precursors, alone or in combination with some other combustional material, while the waste gas is at a relatively high temperature (generally from about 700° C. to about 1200° C.).

An example of such an NO reduction process is described in U.S. Pat. No. 3,900,554 to Lyon, issued Aug. 19, 1975, entitled "Method for the Reduction of the Concentration of NO in Combustion Effluents Using Ammonia." The process disclosed in that patent teaches the reduction Perry shows two experiments in which cyanuric acid is used to reduce No. In one of these experiments a laboratory procedure was used to convert a batch of cyanuric acid into HNCO which was then stored and used in subsequent experiments. These experiments are done in a stainless steel reactor and involved contacting the HNCO with a mixture of NO and argon at temperatures in the range of 582° to 647° C. In the second experiment cyanuric acid was directly contacted with an oxygen containing combustion effluent at temperatures in the 20° to 400° C. range, i.e., a flow of combustion effluents is passed through a bed of solid cyanuric acid, the amount of cyanuric acid which is added to the flowing combustion effluents being dependent on the temperature of the bed of solid acid. After passing through the bed of acid the combustion effluents flow through a second reactor packed with stainless steel balls at a temperature between 450° and 900° C.

Several limitations of the teachings of this reference are to be noted. The reference teaches two methods of contacting cyanuric acid with NO containing gases. In one of these methods the cyanuric acid is decomposed to HNCO which is then purified and stored prior to contacting with the NO containing gas. While this method may be quite satisfactory for laboratory experiments, in any practical application the storage of HNCO would be unacceptable since HNCO is a highly toxic material with very unfavorable storage characteristics. It would be an advancement in the art to provide a method which did not require that hazardous intermediates be stored.

The reference also shown an example in which cyanuric acid is contacted directly with oxygen containing combustion effluents. In this example, however, the reduction of NO was achieved only by using a great excess of cyanuric acid over NO. Use of lessor amounts of cyanuric acid actually caused the NO level to increase, i.e., adding cyanuric acid causes the NO level to increase from an initial value of 600 ppm to higher and higher levels finally climbing to 8900 ppm. Only after enough cyanuric acid has been contacted into the combustion effluents to produce this high level of NO does further addition of cyanuric acid cause a decrease in the NO level.

An additional limitation of this reference relates to the fact that both sets of experiments were done in stainless steel reactors. It si generally believed that stainless steel is a catalyst for the decomposition of HNCO, for the reduction of NO by CO and for other reactions. It would be an advancement in the art to provide a process which reduced NO in combustion effluents but which did not require the presence of stainless steel or other catalytic materials.

As a result, while the use of cyanuric acid provided some hope for obtaining low levels of $NO_x$ emission at moderate temperatures (600° C. to 1100° C.), in actual combustion application, the reduction of $NO_x$ by cyanuric acid has been found to be ineffective at moderate temperatures, and at best, no more effective than existing techniques at high temperatures.

Another group of pollutants which are of major importance are the sulfur oxides (generally collectively designated "$SO_x$"). Sulfur oxides are primarily emitted in the form of sulfur dioxide ("$SO_2$"), with small amounts of accompanying sulfur trioxide ("$SO_3$"). Since there is no harmless gas phase sulfur species analogous to $N_2$, combustion modification has not been useful for controlling $SO_x$ emissions. Exhaust gas cleanup systems, however, including both wet scrubbing and spray drying techniques, are well known and effective.

High temperature (1800° F. to 2800° F.) injection of dry, pulverized limestone has also been used to reduce sulfur emissions. In addition, several recent investigations have shown that CaO injection produces very poor $SO_x$ reduction, but hydrated lime ($Ca(OH)_2$) is effective in reducing $SO_x$ emissions. None of the current literature, however, shows that dry sorbent injection can be directly combined with reducing agent injection to achieve optimum $NO_x$ and $SO_x$ control simultaneously and with relatively small capital cost. Such a process would be a major advancement in the art.

From the discussion above, it is apparent that what is currently needed in the art are methods for the selective, noncatalytic reduction of $NO_x$ which produce $NO_x$ emissions well below those obtainable using prior art methods. It would be an advancement in the art to provide such methods which employed a cyanuric acid process which was effective in actual practice. It would be a further advancement in the art to provide methods for simultaneously controlling $NO_x$ and $SO_x$ emissions.

Such methods are disclosed and claimed below.

BRIEF SUMMARY AND OBJECTS OF THE INVENTION

The present invention relates to methods for selectively reducing $NO_x$ so that nitrogen oxides can be removed from emission effluent streams and $NO_x$ emissions can be reduced to very low levels. In addition, the present invention teaches a method whereby $NO_x$ and $SO_x$ may be simultaneously removed from the effluent stream.

The present invention teaches the reduction of NO$_x$ with cyanuric acid. Contrary to the teachings of the existing literature, such as Perry, however, the present invention teaches a two-step reaction process under carefully controlled conditions for reducing NO$_x$ with cyanuric acid.

Initially, cyanuric acid is decomposed, most likely to form isocyanic acid. The general mechanism for producing isocyanic acid from cyanuric acid is as follows:

$$(HOCN)_3 \rightarrow 3HNCO$$

The reaction of cyanuric acid to produce its decomposition products, such as isocyanic acid or related reaction intermediates, takes place in an oxygen-free, fuel rich, decomposition zone. It is presently preferred that the reaction temperature in this decomposition zone be maintained in the range of from about 1000° F. to about 3000° F., and preferably in the range of from about 1400° F. to about 2400° F. Sufficient residence time should be provided in this oxygen-free zone to ensure complete decomposition of the cyanuric acid reducing agent.

It will be appreciated, furthermore, that NO$_x$ may or may not be a part of the oxygen deficient gases in the oxygen-free, fuel-rich, combustion zone. That is, the production of the reaction intermediates in the oxygen-free decomposition zone may take place within the combustion zone which produces the effluents.

Alternatively, the cyanuric acid decomposition may occur at a location remote from the combustion zone in the presence of CO and water. If the second alternative is chosen, the cyanuric acid decomposition species will then be injected into the effluent stream at an appropriate location.

After the cyanuric acid is decomposed in the absence of oxygen, the decomposition stream is mixed with the effluent stream containing NO$_x$. At this point, the oxygen level of the stream must be carefully controlled to provide an excess of oxygen. It may be necessary at this point to inject air into the effluent stream in order to maintain the proper conditions for NO$_x$ reduction.

In the second "reaction zone," NO$_x$ reduction takes place at temperatures in the range of from approximately 1200° F. to approximately 2600° F. The selective reduction of NO$_x$ in this zone is relatively fast; but residence times in excess of at least 30 milliseconds are preferred in order to assure that complete micromixing occurs.

The molar ratio of equivalent nitrogen (moles of nitrogen) in cyanuric acid to nitrogen in NO$_x$ to be removed should be approximately 0.5:1 to approximately 10:1. Increasing the ratio of the reducing agent to the NO$_x$ increases the extent of NO$_x$ reaction; however, it also increases the overall cost of the control technology and the probability of undesirable trace species being emitted.

The present invention can also be combined with SO$_x$ control technology. Specifically, species used to control SO$_x$ (such as limestone, dolomite, quicklime, and hydrated lime), can be added to the cyanuric acid for injection into the effluent stream. Thus, simultaneous NO$_x$ and SO$_x$ control can be achieved.

It is, therefore, a primary object of the present invention to provide methods for reducing NO$_x$ emissions which are highly selective, noncatalytic, and which are capable of providing overall emission reductions in excess of 90%.

It is a related object of the present invention to provide such methods which are capable of producing exhaust NO$_x$ emission levels at acceptably low levels which are significantly lower than those achieved under typical combustion conditions.

It is another object of the present invention to provide methods which are capable of simultaneously reducing emissions of both NO$_x$ and SO$_x$.

It is also an object of the present invention to provide methods for using cyanuric acid for reducing NO$_x$ which are effective in the actual combustion environment.

These and other objects of the invention will become apparent upon reading the following detailed description and appended claims, and upon reference to the appended drawings.

DESCRIPTION OF THE PREFERRED EMBODIMENTS

I. General Discussion

The present invention is related to a two-stage reaction method of reducing NO$_x$ within an effluent stream using cyanuric acid or cyanuric acid decomposition products. The effluent stream may originate with a fixed facility such as a boiler or with a mobile source such as a gasoline or diesel engine in a motor vehicle. The present invention provides an extremely effective method of effectively eliminating NO$_x$ pollutants. NO$_x$ pollutants can be reduced by more than approximately 90%, thereby producing exhaust NO$_x$ emission levels, under typical conditions, significantly below 100 ppm.

As mentioned above, the present invention operates by the use of cyanuric acid as an NO$_x$ reducing agent. Under the methods now known in the art, cyanuric acid is not useful as an NO$_x$ reducing agent under conditions typical of actual practice without the use of a stainless steel catalyst. The present invention overcomes the obstacles previously encountered in applying the Perry cyanuric acid process in actual practice.

In the first reaction zone of the present invention, cyanuric acid is decomposed. This reaction zone can be referred to generally as the "decomposition zone" and may be within the combustion zone which produces the NO$_x$ emissions, or may be separate. Decomposition of cyanuric acid is necessary in order to provide appropriate species which are effective for NO$_x$ reduction.

It is presently believed that cyanuric acid decomposition proceeds by the following general reaction:

$$(HOCN)_3 \rightarrow 3\ HNCO \qquad (1)$$

That is, cyanuric acid is decomposed to isocyanic acid in the presence of heat. It is possible that isocyanuric acid intermediates or other products may participate in the result achieved by the present invention. For clarity of discussion, a possible reaction mechanism is discussed; however, the proposed mechanism is not intended to limit the scope of the present invention.

The decomposition of cyanuric acid must take place in an oxygen-free (fuel-rich) environment. Thus, the decomposition can take place within the combustion effluent stream at a point where oxygen is deficient. In the alternative, the decomposition of cyanuric acid may take place in a separate oxygen-free decomposition zone containing CO and $H_2O$ but apart from the $NO_x$ containing effluent stream. Cyanuric acid may be injected in any of a number of forms. For example, cyanuric acid as a dry solid, aqueous solution, or alcoholic solution are expected to be acceptable.

As mentioned above, the decomposition must take place at somewhat elevated temperatures. It is presently preferred that the decomposition take place at temperatures between approximately 1000° F. and approximately 3000° F. More specifically, it is presently preferred that the decomposition of cyanuric acid take place at temperatures from about 1400° F. to about 2400° F. Indeed, for some applications, temperatures between about 1400° F. and about 1800° F. are found to be most effective.

The time which the cyanuric acid spends within the decomposition zone should be sufficient to allow complete decomposition of the cyanuric acid species. The reaction time within this zone is preferably from approximately 0.01 seconds to approximately 5.0 seconds. More preferably, the time within the decomposition zone is from approximately 0.03 seconds to approximately 2.0 seconds.

Once the cyanuric acid is fully decomposed it may be introduced into the effluent stream in order to accomplish complete reduction of the $NO_x$ species within the stream. This second reaction zone must be at a location in the effluent stream which is oxygen rich. The reduction of $NO_x$ by the decomposed cyanuric acid species is believed to take place by the following global mechanism:

$$HNCO + NO \rightarrow \tfrac{1}{2}O_2 N_2 + CO_2 + \tfrac{1}{2}H_2O \qquad (2)$$

The temperature within the reaction zone is preferably maintained between approximately 1200° F. and approximately 2600° F. More preferably the temperature within the reaction zone should be maintained within the range of approximately 1400° F. to approximately 1800° F.

The selective reduction of $NO_x$ by the cyanuric acid reaction species occurs at a relatively fast pace. In order to assure complete reaction of the species, however, residence times from approximately 30 milliseconds to approximately 5.0 seconds are required. More preferably reaction times within the range of approximately 30 milliseconds to approximately 2.0 seconds are required.

It is presently preferred that the molar ratio of equivalent nitrogen (moles of N) in the cyanuric acid to the moles of N in the $NO_x$ to be removed should be in the range of from 0.5:1 to about 10:1. More specifically, the range of from about 0.7:1 to about 3:1 is preferred. Increasing the ratio of reducing agent to the $NO_x$ increases the extent of $NO_x$ reduction; however, it also increases the overall cost of the control technology, as well as the probability s of additional undesired species being emitted.

It is also presently preferred that the air/fuel stoichiometric ratio within the decomposition zone be maintained within certain ranges. Air/fuel ratios within the range of about 0.7 to 1.0 are found acceptable, with the most preferred range being from about 0.9 to about 1.0.

In addition to providing $NO_x$ reduction, the present invention can also be used in conjunction with $SO_x$ control. As was mentioned above, injection of dry, pulverized limestone at temperatures from approximately 1800° F. to approximately 2800° F. can be used to reduce sulfur emissions. In addition, hydrated lime ("Ca(OH)$_2$") is more effective than either the raw limestone or intermediate reactant CaO.

Thus, it is within the scope of the present invention to inject a dry sorbent, (such as hydrated lime) simultaneously with the injection of cyanuric acid or cyanuric acid decomposition products. Therefore, sulfur reduction technology can easily be combined with the present invention in order to simultaneously reduce $NO_x$ and $SO_x$ emissions.

II. Experimental Results

Figure 1:
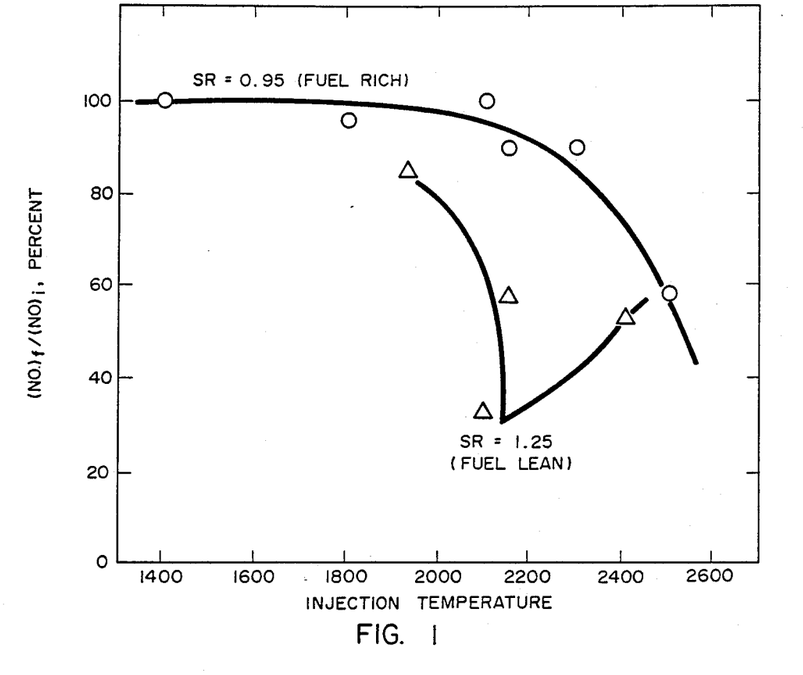
FIG. 1 is a graph which illustrates the direct application of cyanuric acid injected according to the teachings of the existing literature under both fuel rich and fuel lean conditions.

As discussed briefly above, the Perry et al. article, reports that cyanuric acid can be used to reduce $NO_x$, supposedly without the need for controlled amounts of oxygen. FIG. 1 is a graphical representation of data obtained using the process described by Perry et al. under combustion conditions. The data set forth in FIG. 1 were obtained in a 6 inch diameter refractory lined furnace where the primary combustion zone was fired with natural gas at a firing rate of 50,000 BTU/hour. The gas phase NO concentration prior to cyanuric acid injection ("$(NO)_i$") was 600 ppm. The cyanuric acid was added in the form of a dry powder mixed with an inert limestone to facilitate feeding.

The data is presented with the vertical axis showing the ratio of final NO ($(NO)_f$) to initial NO ($(NO)_i$). The horizontal axis represents injection temperature of cyanuric acid into the refractory lined furnace.

The data shown on FIG. 1 indicates that $NO_x$ reductions can be achieved using the process of Perry et al., irrespective of oxygen concentrations at temperatures much higher than those reported by Perry.

Further with reference to FIG. 1, a stoichiometric ratio ("SR") of 1.25 indicates that 25% excess oxygen was present in the flue gas. NO reductions were achieved under both fuel rich (SR=0.95) and fuel lean (SR=1.25) conditions. As would be expected from the existing literature, the optimum temperature is lower in the case of fuel lean injection than with fuel rich injection. In these experiments the stoichiometry remained constant throughout the reactor. The temperature of the cyanuric acid injection was varied by changing the location of the injection point.

While these results show that significant $NO_x$ reductions can be achieved using simple cyanuric acid injection, these results also suggest that (1) it is not possible to achieve extremely low $NO_x$ emissions if the cyanuric acid reducing agent is decomposed and reacted under the same stoichiometric conditions and (2) the process does not work at all in actual combustion gases at the temperatures reported by Perry. These results are consistent with the poor performance which has been observed in practice.

Figure 2:
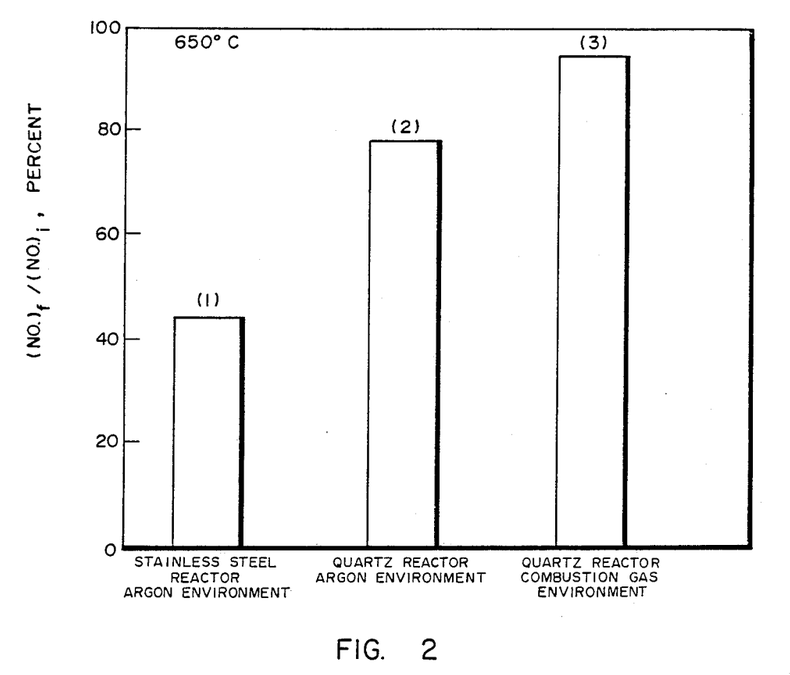
FIG. 2 is a graph which illustrates the reduction of No$_x$ emissions by cyanuric acid in the presence of stainless steel and absence of CO$_2$ and water, in the absence of both and in the absence of stainless steel and in the presence of CO$_2$ and water.

FIG. 2 shows results which were obtained in a flow reactor substantially similar to that used by Perry except that the composition of the reactor wall could be changed as required. These data help explain the apparent disagreement between the results shown in FIG. 1 and those reported by Perry.

If cyanuric acid is injected at 650° C. into a stainless steel reactor containing only inert gases and NO, then significant NO reductions do indeed occur as reported by Perry (Bar 1). However, if the reactor has inert walls (i.e., quartz) or contains actual combustion products (e.g., CO, $CO_2$, $H_2O$, etc.), the reduction is greatly reduced (Bars 2 and 3). Hence, the process reported by Perry will not be effective in a real boiler or engine environment because combustion products will inevitably be present and the bulk of the gas will never contact the walls of the reactor (which will likely not be stainless steel).

Figure 3:
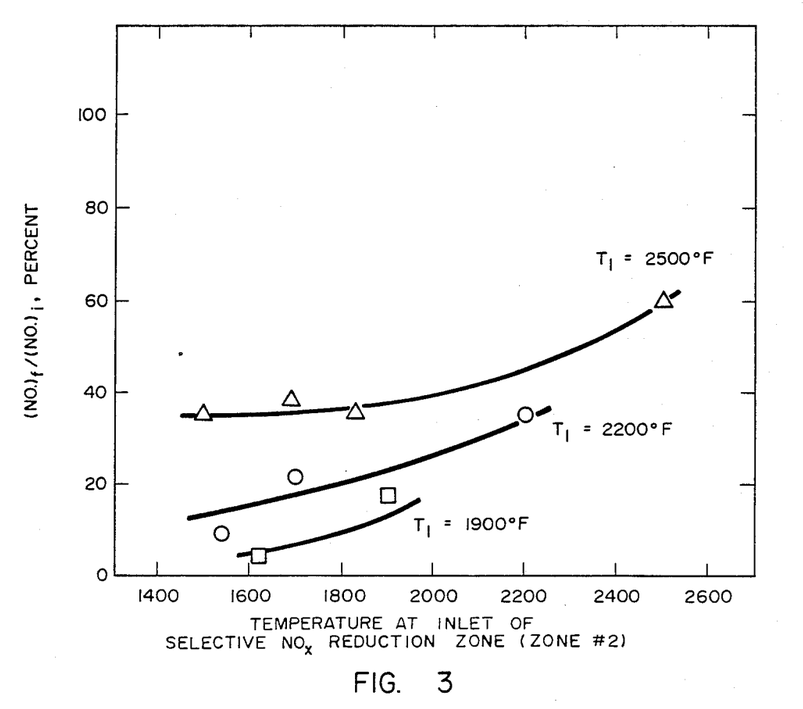
FIG. 3 is a graph which illustrates the reduction of NO$_x$ emissions using the same amount of cyanuric acid as illustrated in FIG. 1, but using the two zone method of the present invention.

FIG. 3 shows the results of an analogous set of experiments to those shown in FIG. 1 using the two zone process of the present invention. The experiments which produce the data which are set forth in FIG. 3 were conducted with the same facility and under the same experimental conditions as that shown in FIG. 1. In particular, the same injection method is used, the same furnace was used, and the same natural gas firing rate was used. In both cases the nitrogen equivalent of the added cyanuric acid was 1.5 times the inlet NO.

In the experiments illustrated in FIG. 3, the cyanuric acid was decomposed in an oxygen deficient zone prior to the reduction of $NO_x$. The overall stoichiometry in the oxygen deficient zone was 0.99 and the selective reaction was allowed to subsequently occur in a downstream zone with an overall stoichiometry of 1.02.

Again the temperature of the decomposition zone was varied by changing the location at which the cyanuric acid injection occurred. The temperature of the selective $NO_x$ reduction zone was varied by changing the location at which the final air was added in order to make the overall stoichiometry fuel lean.

The data presented in FIG. 3 demonstrate that remarkably higher $NO_x$ reduction efficiencies can be achieved using the two zone process than that illustrated using the one zone process of FIG. 1. In addition, a far broader window of acceptable performance exists in a process of the present invention as shown in FIG. 3.

The results reported in FIG. 3 indicate that optimum cyanuric acid decomposition zone temperatures are less than 2200° F., and the optimum selective $NO_x$ reduction temperature is between approximately 1400° F. and approximately 1800° F. for the particular residence time and temperature profile used in these experiments. The residence times used in these experiments were from about 0.01 seconds to about 1.0 seconds for the cyanuric acid decomposition zone and from about 0.01 seconds to about 2.0 seconds for the selective $NO_x$ reduction zone.

Table 1 shows the results of detailed species measurements made within the two zones and in the exhaust. These data indicate that the two zone process does not produce significant quantities of ammonia ("$NH_3$") at any point in the process. This is probably because the likely key reactive intermediate is HNCO and not $NH_3$.

TABLE 1

| Species | Concentration at the end of the decomposition zone | Concentration at the end of the reaction zone |
|---|---|---|
| HCN | 1.0 ppm | 0.3 ppm |
| $NH_3$ | 3.0 ppm | <0.1 ppm |
| HNCO | 540 ppm | <0.1 ppm |

Figure 4:
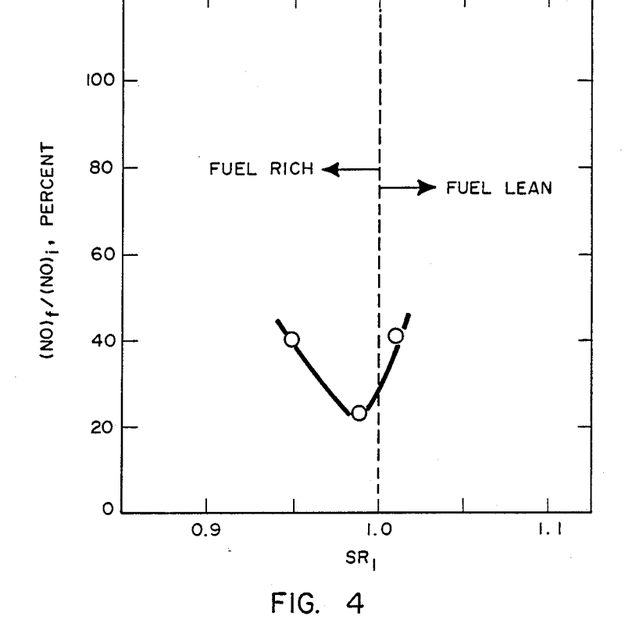
FIG. 4 is a graph which illustrates the influence of the decomposition zone stoichiometry.
Figure 5:
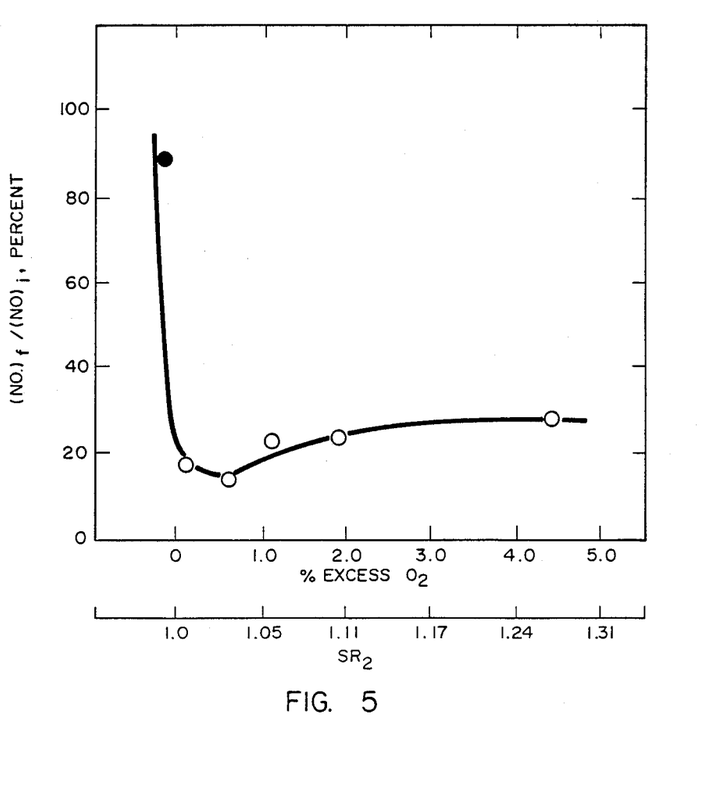
FIG. 5 is a graph which illustrates the influence of the reduction zone stoichiometry.

FIGS. 4 and 5 summarize the results of companion experiments designed to characterize the influence of local oxygen concentrations in both the decomposition zone and the reaction zone. FIG. 4 illustrates the dependence of the selective $NO_x$ reduction zone on the stoichiometry in the cyanuric acid decomposition zone. These data suggest that the optimum environment for cyanuric acid decomposition is one deficient in oxygen where the primary gas phase species are $CO_2$, water, and nitrogen.

FIG. 5 shows the impact of oxygen concentration in the selective $NO_x$ reaction zone. These data confirm that it is critically important that the $NO_x$ zone be operated with a slight excess of oxygen, and that further increases beyond approximately 0.5% oxygen only slightly degrade the performance of the overall process.

Figure 6:
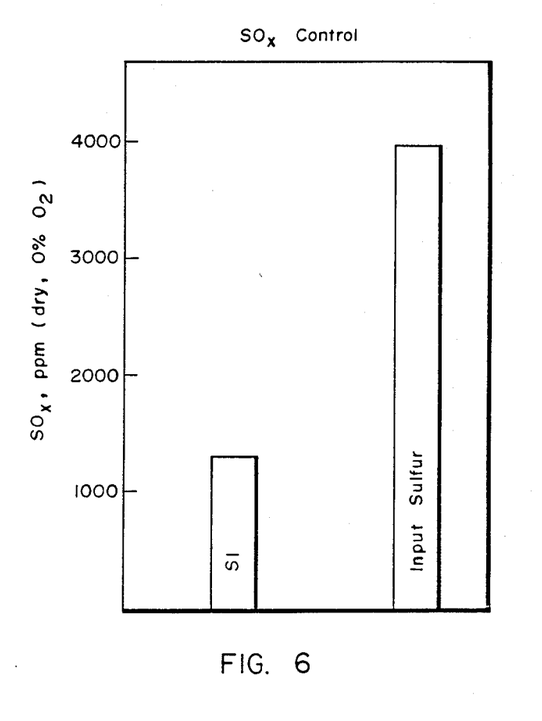
FIG. 6 is a graph which illustrates the SO$_x$ reduction which can be achieved using a cyanuric acid/CaO slurry.

FIG. 6 shows the results of testing using an $NO_x$ control agent in conjunction with CaO in the slurry frm. The data presented in FIG. 6 clearly indicate that it is possible to achieve major reductions of both $NO_x$ and $SO_x$ emissions using the combined reagents of cyanuric acid and CaO. The reactivity of CaO with respect to $SO_2$ is particularly surprising in view of previously reported literature on CaO injection which states that poor $SO_2$ control is achieved with injection of commercial grade CaO (relative to injection of limestone or hydrated lime). The enhancement of performance appears to be directly related to the use of the slurry injection mechanism.

The experimental data presented above clearly indicate that using the two stage mechanism described above, very high levels of $NO_x$ control can be achieved. At the same time, if cyanuric acid is injected along with CaO or other sorbents, corresponding high levels of $SO_x$ control can be acheived. As a result, the present invention provides a clear advancement in the control of $NO_x$ and $SO_x$ emissions.

III. Examples of Preferred Embodiments of the Present Invention

The following examples are given to illustrate the process of the present invention, but the examples are not intended to limit the scope of the present invention.

EXAMPLE 1

In this example, a 6 inch diameter refractory lined furnace was used and was fired by natural gas at a firing rate of 50,000 BTU/hour. The gas phase NO concentration prior to cyanuric acid injection was about 600 ppm. Cyanuric acid was injected into the furnace as a dry powder mixed with an inert substance (i.e., limestone) to facilitate handling.

The ratio of injected cyanuric acid to NO in the combustion effluents was 1.5. The stoichiometric ratio within the furnace was approximately 0.95. That is, the furnace was operated so as to produce combustion effluents in which $O_2$ was deficient. Cyanuric acid was injected in the absence of $O_2$ at temperatures at about 1900° F.

Using these conditions, little or no reduction of NO was observed. Final NO concentrations were in excess of 570 ppm. This illustrates the fact that injection of cyanuric acid into combustion effluents is not in itself an effective process for removing NO in the absence of stainless steel.

EXAMPLE 2

In Example 2, the same facility and reaction conditions as that set forth in Example 1 were used. The nitrogen equivalent of added cyanuric acid was about 1.5 times the inlet NO.

In this example cyanuric acid was decomposed in an oxygen deficient zone with an overall stoichiometry of 0.99. The reaction of the cyanuric acid decomposition products and NO was allowed to occur subsequently in a downstream zone with an overall stoichiometry of 1.01. The temperature of the decomposition zone was held at about 1900° F. and the temperature in the reaction zone was about 1900° F. The concentration of $NO_x$ following the selective reaction zone was 115 ppm.

This example demonstrates that remarkably higher reduction efficiencies can be achieved using the two zone process of the present invention.

EXAMPLE 3

In this example a flow reactor having stainless steel walls was employed. The nitrogen equivalent of added cyanuric acid was about 1.5 times the inlet NO. The only species in the reactor other than the NO and cyanuric acid reactants was argon. The initial concentration of NO was about 600 ppm and the reactor was maintained at a temperature of about 1200° F.

Under these conditions the final NO concentration was about 265 ppm. These results indicate that the process described generally by Perry is effective under idealized conditions.

EXAMPLE 4

In this example the same conditions as those described in Example 3 were produced. The flow reactor, however, was equipped with quartz walls. Under these conditions the NO concentration was reduced from 600 ppm to about 565 ppm.

These results indicate that the absence of stainless steel, the single step process described above is not effective in reducing NO emissions.

EXAMPLE 5

Data was obtained using a 6 inch diameter refractory line furnace where the primary combustion zone was fired with natural gas at a firing rate of 50,000 BTU per hour. The gas phase NO concentration prior to cyanuric acid injection was about 600 ppm.

An initial fuel-rich, oxygen-free zone was maintained, the stoichiometric ratio being 0.99. The temperature in the first zone is maintained at approximately 1900° F. Cyanuric acid was injected into this zone in the form of a solid. Cyanuric acid was allowed to react in this zone for approximately 0.3 seconds.

Subsequently, air was added to the reactants to bring the stoichiometric ratio up to 1.02. The temperature within the oxygen-rich environment was maintained at approximately 1600° F. Mixing between the cyanuric acid products and the combustion effluents in the second took place for approximately 0.5 seconds.

Under these conditions it was found that the concentration of $NO_x$ was reduced from an initial concentration of about 600 ppm to a final concentration of about 30 ppm.

EXAMPLE 6

Data was obtained using a 6 inch diameter refractory line furnace where the primary combustion zone was fired with natural gas at a firing rate of 50,000 BTU per hour. The gas phase NO concentration prior to cyanuric acid injection was about 600 ppm.

An initial oxygen-free zone was maintained, the stoichiometric ratio being 0.99. The temperature in the first zone was maintained at approximately 2500° F. Cyanuric acid was injected into this zone in the form of a solid. Cyanuric acid was allowed to react in this zone for approximately 0.3 seconds.

Subsequently, air was added to the reactants to bring the stoichiometric ratio up to 1.02. The temperature within the oxygen-rich environment was maintained at approximately 2500° F. Mixing between the cyanuric acid decomposition products and the combustion effluents in the second zone takes place for approximately 0.5 seconds.

Under these conditions it was found that the concentration of $NO_x$ was reduced from an initial concentration of about 600 ppm to a final concentration of about 360 ppm.

EXAMPLE 7

Data was obtained using a 6 inch diameter refractory line furnace where the primary combustion zone was fired with natural gas at a firing rate of 50,000 BTU per hour. The gas phase NO concentration prior to cyanuric acid injection was about 600 ppm.

An initial oxygen-free zone was maintained, the stoichiometric ratio being 0.99. The temperature in the first zone is maintained at approximately 2200° F. Cyanuric acid was injected into this zone in the form of a solid. Cyanuric acid is allowed to react in this zone for approximately 0.3 seconds.

Subsequently, air was added to the reactants to bring the stoichiometric ratio to about 1.26. The temperature within the oxygen-rich environment is maintained at approximately 1700° F. Mixing between the cyanuric acid decomposition products and the combustion effluents in the second zone took place for approximately 0.5 seconds.

Under these conditions it was found that the concentration of $NO_x$ was reduced from an initial concentration of about 600 ppm to a final concentration of about 170 ppm.

EXAMPLE 8

Data was obtained using a 6 inch diameter refractory line furnace where the primary combustion zone was fired with Illinois coal at a firing rate of about 50,000 BTU per hour. The gas phase NO concentration prior to cyanuric acid injection was about 540 ppm.

An initial oxygen-free zone was maintained, the stoichiometric ratio being 0.90. The temperature in the first zone was maintained at approximately 2240° F. Cyanuric acid was injected into this zone in the form of an aqueous solution. Cyanuric acid was allowed to react in this zone for approximately 50 milliseconds.

Subsequently, air was added to the reactants to bring the stoichiometric ratio up to 1.25. The temperature within the oxygen-rich environment was maintained at approximately 2000° F. Mixing between the cyanuric acid decomposition products and the combustion effluents in the second zone took place for approximately 350 milliseconds.

Under these conditions it was found that the concentration of $NO_x$ was reduced from an initial concentration of 540 ppm to a final concentration of 50 ppm.

EXAMPLE 9

Data was obtained using a 6 inch diameter refractory line furnace where the primary combustion zone was fired with sulfur containing natural gas at a firing rate of 50,000 BTU per hour. The gas phase $SO_2$ concentration prior to CaO injection was 4000 ppm.

The overall stoichiometric ratio being 1.25. The temperature at the point of injection was approximately 2200° F. CaO was injected into this zone in the form of a slurry with the Ca/S ratio being 2.0. The reactants were allowed to react in this zone for approximately 400 milliseconds.

Under these conditions it was found that the concentration of $SO_2$ was reduced from an initial concentration of 4000 ppm to a final concentration of 1300 ppm.

EXAMPLE 10

Data is obtained using a 6 inch diameter refractory line furnace where the primary combustion zone is fired with natural gas at a firing rate of 50,000 BTU per hour. The gas phase NO concentration prior to cyanuric acid injection is 600 ppm and the $SO_2$ concentration is 4000 ppm.

An initial oxygen-free zone containing CO and $H_2O$ is maintained, the stoichiometric ratio being 0.99. The temperature in the first zone is maintained at approximately 1900° F. Cyanuric acid is injected into this zone in the form of a solid. Cyanuric acid is allowed to react in this zone for approximately 0.3 seconds.

Subsequently, the cyanuric acid decomposition products are added to a reaction zone having an excess of oxygen containing the $NO_x$ to be reduced. In particular the stoichiometric ratio is 1.1. The temperature within the oxygen-rich environment is maintained at approximately 1600° F. Mixing between the cyanuric acid decomposition products and the combustion effluents in the second zone takes place for approximately 0.3 seconds.

In addition, a CaO slurry is injected into the reaction zone combustion products at 2200° F.

Under these conditions it is found that the concentration of $NO_x$ is reduced from an initial concentration of 600 ppm to a final concentration of 30 ppm and the $SO_2$ concentration is reduced from an initial concentration of 4000 ppm to 1300 ppm.

IV. Summary

In summary, it can be seen that using the two zone reaction method of introducing cyanuric acid into an effluent stream provides extremely favorable results. In particular, $NO_x$ emissions can be reduced in excess of 90% with total $NO_x$ emissions being below 100 ppm. The present invention has potential for use in controlling emissions from numerous types of combustion emission sources including stationary boilers and the like, as well as motor vehicles.

The present invention provides that cyanuric acid is decomposed into certain decomposition products in an oxygenfree zone containing CO and $H_2O$. It is presently believed that one of the primary cyanuric acid decomposition products is isocyanic acid. This zone is maintained at a temperature of from about 1000° F. to about 3000° F. Once complete decomposition of cyanuric acid takes place, the cyanuric acid is introduced into a second reaction zone having an excess of oxygen and is mixed further with the combustion effluents. Temperature within this zone is maintained between approximately 1200° F. and approximately 2600° F. Using this two-zone process extremely high levels of $NO_x$ reduction are achieved.

Furthermore, it will be appreciated that $SO_x$ control can also be combined with control of $NO_x$ using this system. It is presently preferred to inject CaO in various forms along with cyanuric acid into the effluent stream. This results in good control of $SO_x$.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A process for selectively reducing nitrogen oxides in combustion effluent streams, comprising the steps of:
   (a) introducing cyanuric acid into a gaseous decomposition zone wherein the decomposition zone is substantially oxygen deficient and contains CO and $H_2O$, and is maintained at a temperature in the range of from approximately 1000° F. to approximately 3000° F.;
   (b) allowing the cyanuric acid sufficient residence time within the decomposition zone to allow for substantial mixing of the cyanuric acid and gaseous species within the decomposition zone;
   (c) introducing the resulting gaseous mixture from the decomposition zone to a reaction zone containing combustion effluents, said reaction zone having an excess of oxygen; and
   (d) allowing the gaseous mixture from the decomposition zone sufficient residence time within the reaction zone to achieve substantial reduction of the nitrogen oxides within the combustion effluents.

2. A process for selectively reducing nitrogen oxides in combustion effluent streams as defined in claim 1 wherein the decomposition zone comprises a portion of the combustion zone wherein the combustion effluents are produced.

3. A process for selectively reducing nitrogen oxides in combustion effluent streams as defined in claim 1 wherein the decomposition zone is remote from the combustion zone wherein the combustion effluents are produced.

4. A process for selectively reducing nitrogen oxides in combustion effluent streams as defined in claim 1 wherein the temperature within the decomposition zone is within the range of from approximately 1400° F. and approximately 2400° F.

5. A process for selectively reducing nitrogen oxides in combustion effluent streams as defined in claim 1 wherein the temperature within the decomposition zone is within the range of from approximately 1400° F. and approximately 1800° F.

6. A process for selectively reducing nitrogen oxides in combustion effluent streams as defined in claim 1 wherein the temperature in the reaction zone is maintained in the range of from approximately 1200° F. to approximately 1800° F.

7. A process for selectively reducing nitrogen oxides in combustion effluent streams as defined in claim 1 wherein the residence time within the decomposition zone is from about 10 milliseconds to about 5.0 seconds.

8. A process for selectively reducing nitrogen oxides in combustion effluent streams as defined in claim 1 wherein the residence time within the decomposition zone is from about 30 milliseconds to about 2.0 seconds.

9. A process for selectively reducing nitrogen oxides in combustion effluent streams as defined in claim 1 wherein the residence time within the reaction zone is from approximately 30 milliseconds to approximately 5.0 seconds.

10. A process for selectively reducing nitrogen oxides in combustion effluent streams as defined in claim 1 wherein the residence time within the reaction zone is between approximately 30 milliseconds and approximately 2.0 seconds.

11. A process for selectively reducing nitrogen oxides in combustion effluent streams as defined in claim 1 wherein the excess of oxygen within the reaction zone is achieved by the injection of oxygen into the decomposition zone.

12. A process for selectively reducing nitrogen oxides in combustion effluent streams as defined in claim 10 wherein oxygen is injected in the form of air.

13. A process for selectively reducing nitrogen oxides in combustion effluent streams as defined in claim 2 wherein the equivalent mole ratio of nitrogen in the cyanuric acid to nitrogen in the nitrogen oxides in the decomposition zone is in the range of from approximately 0.5:1 to approximately 10:1.

14. A process for selectively reducing nitrogen oxides in combustion effluent streams as defined in claim 13 wherein the equivalent mole ratio of nitrogen in the cyanuric acid to nitrogen in the nitrogen oxides is in the range of from approximately 0.7:1 to 3:1.

15. A process for selectively reducing nitrogen oxides in combustion effluent streams as defined in claim 2 wherein the air to fuel stoichiometric ratio in the decomposition zone is within the range of approximately 0.7 to approximately 1.0.

16. A process for selectively reducing nitrogen oxides in combustion effluent streams as defined in claim 15 wherein the air to fuel stoichiometric ratio in the decomposition zone is within the range of from approximately 0.9 to approximately 1.0.

17. A process for selectively reducing nitrogen oxides in combustion effluent streams as defined in claim 1 wherein the cyanuric acid is introduced into the decomposition zone as a dry solid.

18. A process for selectively reducing nitrogen oxides in combustion effluent streams as defined in claim 1 wherein the cyanuric acid is introduced into the decomposition zone as an aqueous solution.

19. A process for selectively reducing nitrogen oxides in combustion effluent streams as defined in claim 1 wherein the cyanuric acid is introduced into the decomposition zone as an alkanolic solution.

20. A process for reducing $NO_x$ in a combustion effluent stream, comprising the steps of:
(a) introducing cyanuric acid into a stream of combustion effluents, said combustion effluents being fuel-rich and being substantially oxygen free and having a temperature in the range of from approximately 1000° F. and approximately 3000° F. such that the mole ratio of nitrogen in cyanuric acid to nitrogen in the $NO_x$ is in the range of from approximately 0.5:1 to approximately 10:1;
(b) substantially mixing the cyanuric acid mixture produced in step (a) with gases containing $NO_x$ to be reduced; and
(c) maintaining the resulting mixture at a temperature in the range of from approximately 1200° F. to approximately 2600° F. and maintaining the oxygen content of the resulting mixture in the range of less than approximately 10%.

21. A process for reducing $NO_x$ as defined in claim 20 wherein the combustion effluents in step (a) are maintained at a temperature in the range of from approximately 1400° F. to approximately 2400° F.

22. A process for reducing $NO_x$ as defined in claim 20 wherein the combustion effluents in step (a) are maintained at a temperature in the range of from approximately 1400° F. to approximately 1800° F.

23. A process for reducing $NO_x$ as defined in claim 20 wherein the mixture defined in step (c) is maintained at a temperature in the range of from approximately 1200° F. to approximately 1800° F.

24. A process for reducing $NO_x$ as defined in claim 20 wherein the mole ratio of nitrogen in cyanuric acid to nitrogen in the $NO_x$ is in the range of from approximately 0.7:1 to approximately 3:1.

25. A process for reducing $NO_x$ as defined in claim 20 wherein the cyanuric acid is introduced as a dry solid.

26. A process for reducing $NO_x$ as defined in claim 20 wherein the cyanuric acid is introduced as an aqueous solution 27. A process for reducing $NO_x$ as defined in claim 20 wherein the cyanuric acid is introduced as an alkanolic solution.

28. A process for removing nitrogen oxides and sulfur oxides from combustion effluent streams, comprising the steps of:
(a) introducing cyanuric acid and an $SO_x$ removal agent into a gaseous decomposition zone wherein the decomposition zone is oxygen deficient and is maintained at a temperature of from approximately 1000° F. to approximately 3000° F.;
(b) allowing the cyanuric acid and $SO_x$ removal agent sufficient residence time with the decomposition zone to allow for complete mixing between the cyanuric acid and the gaseous species within the decomposition zone;
(c) introducing the gaseous mixture from the decomposition zone to a reaction zone containing combustion effluents, said reaction zone having an excess of oxygen; and
(d) allowing the gaseous mixture from the decomposition zone sufficient residence time within the reaction zone to facilitate reduction of the $NO_x$ within the combustion effluents and removal of $SO_x$.

29. A process for removing nitrogen and sulfur oxides from combustion effluent streams as defined in claim 28 wherein the decomposition zone comprises a portion of the combustion zone wherein the combustion effluents are produced.

30. A process for removing nitrogen and sulfur oxides from combustion effluent streams as defined in claim 28 wherein the temperature within the decomposition zone is within the range from approximately 1400° F. and approximately 2400° F.

31. A process for removing nitrogen and sulfur oxides from combustion effluent streams as defined in claim 28 wherein the $SO_x$ removal agent is added separately from the cyanuric acid.

32. A process for removing nitrogen and sulfur oxides from combustion effluent streams as defined in claim 28 wherein the $SO_x$ removal agent is added in a slurry.

33. A process for selectively reducing nitrogen oxides in an effluent stream from fossil fuel combustion, said process comprising the steps of:
controlling the oxygen content within the combustion zone to provide fuel rich combustion gases;
adjusting the temperature of said combustion gases such that the temperature is in the range of from about 1000° F. to about 3000° F.
injecting cyanuric acid into the fuel rich combustion gases in an amount such that the equivalent nitrogen mole ratio of cyanuric acid to $NO_x$ is in the range of from about 0.5:1 to about 10:1;
allowing the cyanuric acid to decompose within said combustion gases for a period of from about 10 milliseconds to about 5.0; and
adding combustion air to the gaseous mixture and adjusting the temperature of the resulting mixture to within the range of approximately 1000° F. to approximately 2600° F. and providing a residence time of from about 30 milliseconds to approximately 5.0 seconds in order to allow for reduction of $NO_x$ species.

34. A process for selectively reducing nitrogen oxides as defined in claim 33 wherein the temperature within the combustion zone is within the range of from approximately 1200° F. and approximately 3000° F.

35. A process for selectively reducing nitrogen oxides in combustion effluent streams as defined in claim 33 wherein the temperature within the combustion zone is within the range of from approximately 1400° F. and approximately 2200° F.

36. A process for selectively reducing nitrogen oxides in combustion effluent streams as defined in claim 33 wherein the residence time within the combustion zone is from about 0.02 seconds to about 2.0 seconds.

37. A process for selectively reducing nitrogen oxides in combustion effluent streams as defined in claim 33 wherein the equivalent mole ratio of nitrogen in cyanuric acid to $NO_x$ is in the range of from approximately 0.7:1 to 3:1.

38. A process for selectively reducing nitrogen oxides in combustion effluent streams as defined in claim 33 wherein the air to fuel stoichiometric ratio in the combustion zone is within the range of approximately 0.7 to approximately 1.0.

39. A process for selectively reducing nitrogen oxides in combustion effluent streams as defined in claim 33 wherein the air to fuel stoichiometric ratio in the combustion zone is within the range of from approximately 0.9 to approximately 1.0.

40. A process for removing nitrogen oxides and sulfur oxides from combustion effluent streams, comprising the steps of:
(a) introducing cyanuric acid and an $SO_x$ removal agent into a gaseous decomposition zone wherein the decomposition zone is substantially oxygen deficient and is maintained at a temperature of from approximately 1000° F. to approximately 3000° F., said $SO_x$ removal agent being selected from the group consisting of limestone, quicklime, and hydrated lime;
(b) allowing the cyanric acid and $SO_x$ removal agent sufficient residence time with the decomposition zone to allow for complete mixing between cyanuric acid and the gaseous species within the decomposition zone;
(c) introducing the gaseous mixture from the decomposition zone to a reaction zone containing combustion effluents, said reaction zone having an excess of oxygen; and
(d) allowing the gaseous mixture from the decomposition zone sufficient residence time within the reaction zone to facilitate reduction of the $NO_x$ within the combustion effluents and removal of $SO_x$.

41. A process for removing nitrogen and sulfur oxides from combustion effluent streams as defined in claim 40 wherein the decomposition zone comprises a portion of the combustion zone wherein the combustion effluents are produced.

42. A process for removing nitrogen and sulfur oxides from combustion effluent streams as defined in claim 40 wherein the temperature within the decomposition zone is within the range from approximately 1400° F. and approximately 2400° F.

43. A process for removing nitrogen and sulfur oxides from combustion effluent streams as defined in claim 40 wherein the $SO_x$ removal agent is added separately from the cyanuric acid.

44. A process for removing nitrogen and sulfur oxides from combustion effluent streams as defined in claim 40 wherein the $SO_x$ removal agent is added in a slurry.

* * * * *

UNITED STATES PATENT AND TRADEMARK OFFICE
CERTIFICATE OF CORRECTION

PATENT NO. : 4,861,567
DATED : August 29, 1989
INVENTOR(S) : Michael P. Heap et al It is certified that error appears in the above-identified patent and that said Letters Patent is hereby corrected as shown below:

Column 3, line 35, "No" should be --NO--

Column 3, line 38, "are" should be --were--

Column 4, line 12, "si" should be --is--

Column 7, line 50, "HNCO + NO → 1/4 O2N2 + CO2 + 1/2 H2O" should be --HNCO + NO + ¼ O2 → N2 + CO2 + ½ $H_2O$--

Column 8, line 5, "s of" should be --of--

Column 10, line 28, "frm" should be --form--

Column 10, line 45, "acheived" should be --achieved--

Column 13, line 64, "oxygenfree" should be --oxygen-free--

Column 18, line 19, "cyanric" should be --cyanuric--

Signed and Sealed this

Twenty-ninth Day of January, 1991

*Attest:*

HARRY F. MANBECK, JR.

*Attesting Officer*      *Commissioner of Patents and Trademarks*